United States Patent
Skiff et al.

(10) Patent No.: US 11,219,228 B2
(45) Date of Patent: Jan. 11, 2022

(54) EUTECTIC FLAVOR SYSTEMS

(71) Applicant: Firmenich SA, Satigny (CH)

(72) Inventors: Ronald H. Skiff, Plainsboro, NJ (US);
Ernst L. Steinboeck, Geneva (CH);
Jean-Francois Basset, Plainsboro, NJ (US)

(73) Assignee: FIRMENICH SA, Satigny (CH)

( * ) Notice: Subject to any disclaimer, the term of this patent is extended or adjusted under 35 U.S.C. 154(b) by 450 days.

(21) Appl. No.: 15/308,298

(22) PCT Filed: Apr. 16, 2015

(86) PCT No.: PCT/EP2015/058229
§ 371 (c)(1),
(2) Date: Nov. 1, 2016

(87) PCT Pub. No.: WO2015/165738
PCT Pub. Date: Nov. 5, 2015

(65) Prior Publication Data
US 2017/0055555 A1   Mar. 2, 2017

Related U.S. Application Data

(60) Provisional application No. 61/987,451, filed on May 1, 2014.

(51) Int. Cl.
| | | |
|---|---|---|
| A23L 2/56 | (2006.01) | |
| A23L 5/00 | (2016.01) | |
| A23L 2/385 | (2006.01) | |
| A23L 29/00 | (2016.01) | |
| A23L 29/30 | (2016.01) | |
| A23L 27/00 | (2016.01) | |
| A23L 27/20 | (2016.01) | |
| A23L 27/30 | (2016.01) | |

(52) U.S. Cl.
CPC .............. *A23L 2/56* (2013.01); *A23L 2/385* (2013.01); *A23L 5/00* (2016.08); *A23L 27/00* (2016.08); *A23L 27/2024* (2016.08); *A23L 27/31* (2016.08); *A23L 27/37* (2016.08); *A23L 27/80* (2016.08); *A23L 29/00* (2016.08); *A23L 29/035* (2016.08); *A23L 29/30* (2016.08); *A23L 29/37* (2016.08); *A23V 2002/00* (2013.01)

(58) Field of Classification Search
CPC . A23L 29/30; A23L 29/37; A23L 2/56; A23L 2/385; A23L 5/00; A23L 27/00; A23L 27/2024; A23L 27/31; A23L 27/37; A23L 27/80; A23L 29/00; A23L 29/035; A23L 2/52
See application file for complete search history.

(56) References Cited

U.S. PATENT DOCUMENTS

| | | | | |
|---|---|---|---|---|
| 2007/0224261 A1* | 9/2007 | Draper | ................. | A61K 9/4858 424/452 |
| 2008/0226799 A1* | 9/2008 | Lee | .......... | A23L 27/30 426/590 |
| 2012/0088025 A1* | 4/2012 | Baniel | ..................... | C13K 1/00 426/658 |

FOREIGN PATENT DOCUMENTS

| | | | | |
|---|---|---|---|---|
| CN | 101897429 A | 12/2010 | | |
| CN | 103504270 | 3/2015 | | |
| EP | 1842436 A1 | 1/2006 | | |
| JP | 2005058065 A | 10/2005 | | |
| WO | WO-2011155829 A1 * | 12/2011 | ........... | B01D 9/0036 |
| WO | 2013025251 A1 | 2/2013 | | |
| WO | WO-2015044136 A1 * | 4/2015 | ........... | A23L 27/201 |
| WO | WO-2015044139 A1 * | 4/2015 | ............... | A21D 2/14 |

OTHER PUBLICATIONS

Dai, Y., van Spronsen, J., Witkamp, G.-J., Verpoorte, R., Choi, Y.H. 2013. "Natural Deep Eutectic Solvents as new potential media for green technology." pp. 61-80. Natural deep Eutectic solvents and their application in natural product research and development. Dai, Y., 2013, Doctoral thesis, Leiden University.*
Imperato, G., Eibler, E., Niedermaier, J., Konig, B. 2005. "Low-melting sugar-urea-salt mixtures as solvents for Diels-Alder reactions." Chem. Commun., pp. 1170-1172.*
Naser, J., Mjalli, F., Jibril, B., Al-Hatmi, S., and Gano, Z. 2013. "Potassium Carbonate as a Salt for Deep Eutectic Solvents." International Journal of Chemical Engineering and Applications. vol. 4, pp. 114-118.*
Clark, Daniel. "Important Facts about Sodium Citrate." Posted Sep. 24, 2015. Technology Org. 7 pages.*
International Search Report and Written Opinion, application PCT/EP2015/058229 dated Jul. 20, 2015.
Thomson Scientific, London, GB, CN 101897420A, 2010.

* cited by examiner

*Primary Examiner* — Nikki H. Dees
(74) *Attorney, Agent, or Firm* — Armstrong Teasdale LLP

(57) ABSTRACT

Provided is a liquid system comprising a first component and a second component the components selected from the group consisting of carbohydrates, sugar alcohols, food grade acids, food grade non-aqueous solvents and food grade salts wherein: a. the second component is different than the first component; b. the system has a melting point lower than each of the components; and c. the liquid system comprises 7% or less water. The systems are useful for protecting an active ingredient in a food system wherein the ingredient is stable at room temperature and retains its sensory properties after being diluted into an aqueous beverage for example to form a flavored aqueous beverage.

8 Claims, 12 Drawing Sheets

EUTECTIC FLAVOR SYSTEMS

This application is a 371 filing of International Patent Application PCT/EP2015/058229 filed Apr. 16, 2015, which claims the benefit of U.S. patent application No. 61/987,451 filed May, 1, 2014

FIELD

The field relates to liquid food and beverage systems used to stabilize food ingredients for example against oxidation and/or acid catalyzed degradation.

BACKGROUND

Current water based liquid food systems often provide insufficient solubility properties for specific ingredients, thus limiting the amount of the ingredients that may be added to a water based liquid food system. Additionally, some flavor systems, such as citrus flavors, may be unstable in low pH, aqueous liquid food systems.

It is also desirable to reduce the water content in liquid food systems in order to allow for sufficient solubility or to improve the stability of ingredients in low pH systems.

SUMMARY

Provided herein is a liquid system comprising a first component and a second component wherein the first component and the second are different and are selected from the group consisting of carbohydrates, sugar alcohols, food grade acids and food grade salts and a non-aqueous solvent such as glycerin, propylene glycol or 1,3-propanediol wherein:
a. the system has a melting point lower than each of the components; and
b. the system comprises 7% or less water.

Further provided here is a method of protecting a food ingredient from oxidation and/or acid-catalyzed degradation comprising adding the ingredient to a liquid system comprising a first component and a second component wherein the second component is different than the first and both components are selected from the group consisting of carbohydrates, sugar alcohols, food grade acids, food grade salts and a solvent wherein:
a. the system has a melting point lower than each of the components; and
b. the system comprises 7% or less water.

DETAILED DESCRIPTION

Figure 1:
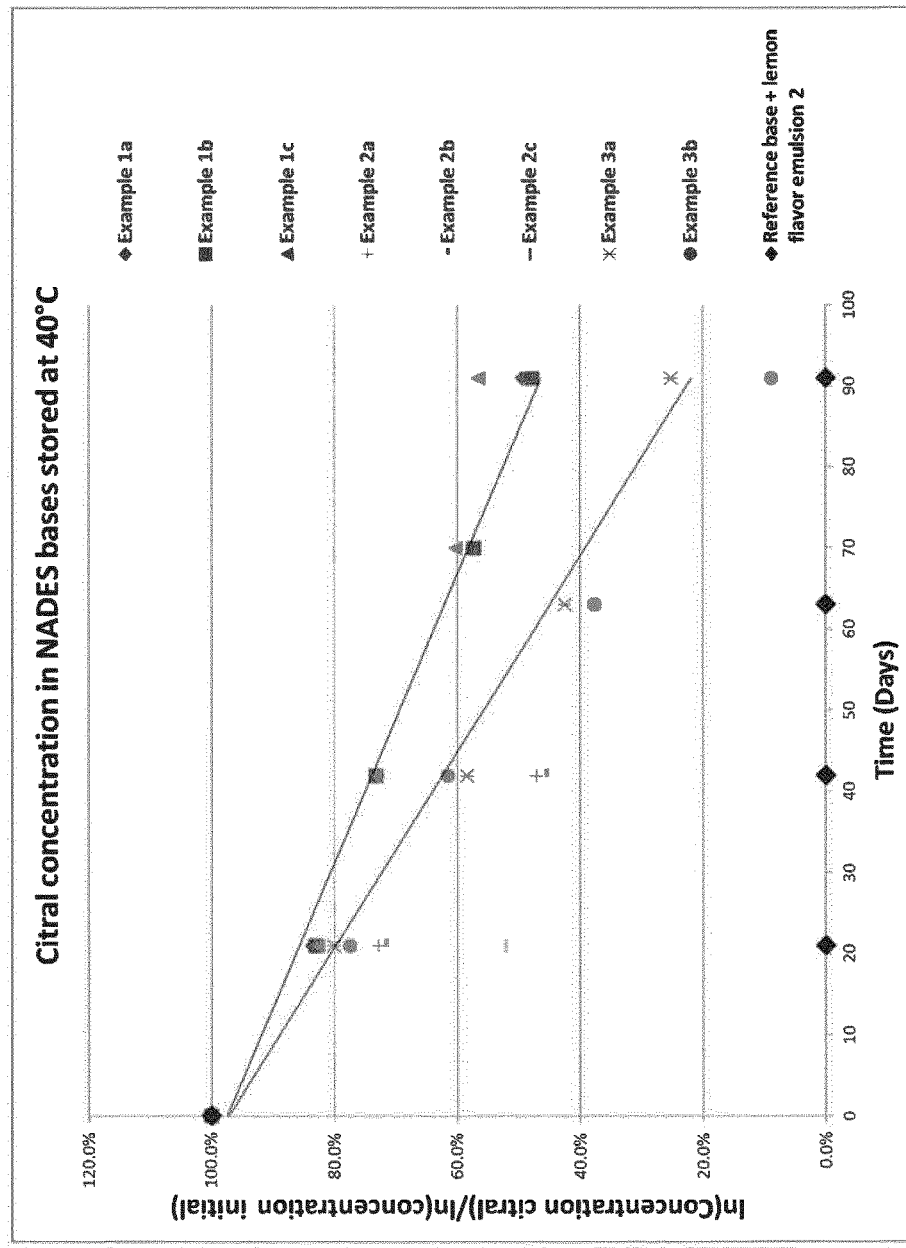
FIG. 1. Concentrations of citral, a key lemon flavor compound, in NADES bases relative to a generic reference as a function of time of examples 1a to 1d, 2a to 2d and 3a to 3b.

For the descriptions herein and the appended claims, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

While not wishing to be bound to any theory, the systems provided herein may be referred to as Natural Deep Eutectic Systems (NADES).

In a further embodiment, the system comprises a third component that is different than the first and second components and is selected from the group consisting of carbohydrates, sugar alcohols, food grade acids, food grade salts and non-aqueous solvents wherein the system has a melting point lower than each of the components and comprises 7% or less water.

In a further embodiment, the first, second, or third component is selected from the group consisting of malic acid, citric acid, maleic acid, lactic acid, tartaric acid, sorbic acid, glucose, erythritol, fructose, sorbitol, sucrose, trehalose, xylitol, polydextrose, glycerin and propylene glycol.

In a further embodiment the system comprises a first component selected from the group consisting of malic acid, citric acid, maleic acid, lactic acid, tartaric acid, and sorbic acid, a second component selected from the group consisting of glycerin, propyleneglycol and 1,3-propanediol. In a particular embodiment, the system comprises a third component selected from the group consisting of glucose, erythritol, fructose, sorbitol, sucrose, trehalose and xylitol.

In a particular embodiment the first, second, third or fourth component is of low viscosity and plant derived, all with neutral taste.

In another embodiment, the components are isolated. "Isolated" as used herein means that the components, particularly the combined components, are separated from a plant or its natural environment and/or are formulated outside of a plant or its natural environment.

In one embodiment, upon one hundred fold dilution, the system has a pH in the range of from about 1.7 to about 7, more particularly from about 2 to about 4, even more particularly at about 3 to 4.

In another embodiment, the weight of the combined components is provided in an amount, by weight, from about 50 to 99% of the total weight of the system.

In a particular embodiment, the first component and the second components are provided in a ratio from about 0.5:1 to about 8:1, particularly in a ratio of from about 1:1 to about 4:1, more particularly, in a ratio from about 1:1 to about 1:2, and even more particularly in a ratio of about 1:1.

In a three component solvent system, particular embodiments comprise the three components in a ratio of about 1:1:1 to about 6:4:1. Particularly from about 2:1:1: to about 4:1:1. In another aspect, three components are provided in a ratio of 2:1:2 to about 4:1:2. In another aspect, the three components are provided in a ratio from about 1:1:1 to about 4:3:1.

In a further embodiment, the system comprises an active ingredient suitable for use in food and beverages wherein the ingredient is susceptible to oxidation and/or acid degradation. The below listed ingredients may be used in the system to be protected against oxidation and/or degradation or the listed ingredients can also be used as a co-ingredient in combination with an active ingredient susceptible to oxidation and/or acid degradation.

Particular ingredients provided herein are flavors or flavor compositions particularly those flavors characterized by a log P value of 2 or more. By "flavor or flavoring composition," it is meant here a flavoring ingredient or a mixture of flavoring ingredients, solvents or adjuvants used or the preparation of a flavoring formulation, i.e. a particular mixture of ingredients which is intended to be added to an edible composition (including but not limited to a beverage) or chewable product to impart, improve or modify its organoleptic properties, in particular its flavor and/or taste. Flavoring ingredients are well known to a person skilled in the art and their nature does not warrant a detailed description here, which in any case would not be exhaustive, the skilled flavorist being able to select them on the basis of his or her general knowledge and according to the intended use or application and the organoleptic effect it is desired to achieve. Many of these flavoring ingredients are listed in reference texts such as in the book by S. Arctander, Perfume and Flavor Chemicals, 1969, Montclair, N.J., USA, or its more recent versions, or in other works of similar nature such as Fenaroli's Handbook of Flavor Ingredients, 1975, CRC Press or Synthetic Food Adjuncts, 1947, by M. B. Jacobs, van Nostrand Co., Inc. Solvents and adjuvants of current use for the preparation of a flavoring formulation are also well known in the industry.

Further provided herein are flavors that are derived from or based on fruits where citric acid is the predominant, naturally-occurring acid include but are not limited to, for example, citrus fruits (e.g., lemon, lime), limonene, strawberry, orange, and pineapple. In one embodiment, the flavor is lemon, lime or orange juice extracted directly from the fruit. Further embodiments of the flavor comprise the juice or liquid extracted from oranges, lemons, grapefruits, limes, citrons, clementines, mandarins, tangerines, and any other citrus fruit, or variation or hybrid thereof. In a particular embodiment, the flavor comprises a liquid extracted or distilled from oranges, lemons, grapefruits, limes, citrons, clementines, mandarins, tangerines, any other citrus fruit or variation or hybrid thereof, pomegranates, kiwifruits, watermelons, apples, bananas, blueberries, melons, ginger, bell peppers, cucumbers, passion fruits, mangos, pears, tomatoes, and strawberries.

In a further embodiment, the flavor is lemon or lime. In a further embodiment the flavor comprises citral.

Other active ingredients contemplated for use herein are those selected from the group consisting of 4-amino-5-(3-(isopropylamino)-2,2-dimethyl-3-oxopropoxy)-2-methylquinoline-3-carboxylic acid; 4-amino-5,6-dimethylthieno[2,3-d]pyrimidin-2(1H)-one; (S)-1-(3-(((4-amino-2,2-dioxido-1H-benzo[c][1,2,6]thiadiazin-5-yl)oxy)methyl)piperidin-1-yl)-3-methylbutan-1-one; and 3-[(4-amino-2,2-dioxido-1H-2,1,3-benzothiadiazin-5-yl)oxy]-2,2-dimethyl-N-propylpropanamide.

Further ingredients contemplated for use herein comprise those selected that are sweetness imparting compounds. In a particular embodiment the sweetness imparting compound is selected from the group consisting of *stevia* extracts, glycosylated derivatives of *stevia* extracts (for example, but not limited to, the transglucosylated sweet glycoside mixture of *Stevia*), sugars (for example, but not limited to, sucrose, glucose, fructose, high fructose corn syrup and corn syrup), sucralose, D-tryptophan, NHDC, polyols (sugar alcohols for example but not limited to sorbitol, xylitol, mannitol, xylose, arabinose, rhamnose and lactose), stevioside, Rebaudioside A, thaumatin, mogrosides (for example but not limited to those present in Luo Han Guo extract), monellin, neotame, aspartame, alitame, potassium acesulfame, saccharine, monoammonium glycyrrhizinate, calcium cyclamate, sodium cyclamate, sodium saccharin, potassium saccharin, ammonium saccharin, and calcium saccharin.

In another embodiment, the system provided herein comprises a salt. In a particular embodiment the salt provides a counter-ion of an acid wherein the acid is provided as a component of a system described herein. In a particular embodiment, the salt comprises a conjugate base of an acid wherein the acid is provided as a component of a NADES system described herein. In a particular embodiment the salt is a food grade salt. In a more particular embodiment, the salt is selected from the group consisting of sodium citrate, sodium lactate, sodium benzoate, and sodium sorbate.

In another embodiment, a system provided herein comprises a surfactant. In a particular embodiment, the surfactant is selected from the group consisting of polysorbate 80 (e.g., Tween® 80), phosphatidylcholine, and sodium monopalmitate.

In one embodiment, a system provided herein comprises less than or equal to about 7%, more particularly less than 5%, more particularly less than 3%, more particularly about less than 0.002% and even more particularly 0% added water, by weight, of the total weight of the system.

In another embodiment, the system further comprises a food grade solvent particularly ones used for food, in particular flavor ingredients. A particular food grade solvent may be selected from the group consisting of ethyl alcohol, polysorbate 80, benzyl alcohol, triacetin, 1,3-propanediol, and glycerol. In a particular embodiment, the food grade solvent is propylene glycol.

Further provided herein is an aqueous beverage comprising the systems described above having an active ingredient wherein the ratio of the system, by weight, to the beverage is between about 1:60 and about 1:120. Particularly, the ratio of the system to the beverage is about 1:120. In a particular embodiment, the system when diluted in water provides a flavored beverage.

The systems provided herein provide for good stability of the active ingredient for example wherein the active ingredient is substantially stable against oxidation, acid degradation, and/or crystallization for a period of at least 13 weeks at 40° C.

In a particular embodiment, the active ingredient in the system is substantially stable against oxidation, acid degradation and/or crystallization for a period of at least 1 year at room temperature.

Further provided herein is a method of making an aqueous beverage having an active agent comprising:
i) mixing a first component and a second component to form a mixture of the two components wherein the second component is different than the first component and the first and second components are selected from the group consisting of carbohydrates, sugar alcohols, food grade acids, food grade salts and a solvent wherein:
  1) the system has a melting point lower than each of the components; and
  2) the liquid system comprises 7% or less water;
ii) heating the mixture until a molten liquid is formed;
iii) allowing the molten liquid to reach room temperature wherein the mixture remains a liquid system at room temperature;
iv) adding an active ingredient to the liquid system to form a liquid system with an active ingredient;
v) diluting the liquid system having the active ingredient into an aqueous beverage to form an aqueous beverage having the liquid system with the active ingredient.

In a further embodiment, the mixture is heated to a temperature from about 90 to 135° C.

In one embodiment, the ingredient is emulsified. In a further embodiment, an emulsified ingredient is added to the liquid mixture in the method described above.

In a particular embodiment, the ingredient is emulsified in situ when added to a system provided herein.

Further provided herein is a method of protecting an active ingredient from oxidation, acid degradation and/or crystallization comprising adding the ingredient to any one of the systems described above.

In another embodiment, the systems provided herein improve the stability and/or the solubility of specific ingredients. In a particular embodiment the water activity of the system is reduced along with the melting point to achieve a stable liquid phase with no or very little amount of water.

Provided below in Table 1 is a non-exhaustive list of potential systems shown along with the specific components.

TABLE 1

Examples of NADES systems optionally with glycerine

| List of natural DES (Deep Eutectic Solvents) Ingredients | Molar Ratio | Water % |
|---|---|---|
| Malic acid:Glucose | 1:1 | 7 |
| Malic acid:Fructose | 1:1 | 7 |
| Malic acid:Sucrose | 1:1 | 7 |
| Citric acid:Glucose | 2:1 | 7 |
| Citric acid:Trehalose | 2:1 | 7 |
| Citric acid:Sucrose | 1:1 | 7 |
| Citric acid:Erythritol | 1:1 | 7 |
| Maleic acid:Glucose | 4:1 | 7 |
| Maleic acid:Sucrose | 1:1 | 7 |

TABLE 1-continued

Examples of NADES systems optionally with glycerine

| List of natural DES (Deep Eutectic Solvents) Ingredients | Molar Ratio | Water % |
|---|---|---|
| Glucose:Fructose | 1:1 | 7 |
| Fructose:Sucrose | 1:1 | 7 |
| Glucose:Sucrose | 1:1 | 7 |
| Sucrose:Glucose:Fructose | 1:1:1 | 7 |
| Malic acid:Trehalose;Glycerin | 2:1:1 | 7 |
| Lactic acid:Erythritol | 3:1 | 7 |
| Lactic acid: Sorbitol | 2:1 | 0 |
| Fructose; Glycerin | 1:1 | 0 |
| Fructose; Glycerin | 1:2 | 0 |
| Fructose; Glycerin; Malic acid | 1:1:1 | 7 |
| Glucose; Glycerin | 1:2 | 0 |
| Citric acid; Trehalose; Glycerin | 2:1:2 | 7 |
| Citric acid; Fructose; Glycerin | 1:1:2 | 7 |
| Lactic acid; Sorbitol | 1:1 | 7 |
| Citric acid; Glycerin | 1:5 | 0 |
| Citric acid; Glycerin | 1:7.5 | 0 |
| Lactic acid; Glycerin | 1:2 | 0 |
| Citric acid; propylene glycol | 1:7.5 | 0 |

The below examples are illustrative only and are not meant to limit the claims or embodiments described herein.

EXAMPLES

Example 1a

A 100 g two component NADES system was prepared along with additional components as set forth in Table 2. All components, except the flavor emulsion, were added, mixed and heated until a molten liquid was formed. Samples typically should be heated from about 90 to about 135° C. Here the system was heated to 110° C. in a conventional 8000 W microwave oven for about 2 minutes. The liquid was allowed to cool to room temperature where it remained in the liquid form. Flavor emulsion 1, which contained 10,000 ppm ascorbic acid, was mixed into the cold NADES base system to give a formulation with a pH of about 3.5 upon 100-fold dilution and a water activity of 0.4631 at room temperature. After 2-8 weeks at room temperature we observed precipitation.

TABLE 2

Components of Erythritol/Lactic Acid NADES formulation used in Example 1a

| | Amount (wt) | | solids (purity) of raw material w % | water contrib. in g |
|---|---|---|---|---|
| Erythritol | 20 | 0.1 | 100 | 0 |
| Lactic acid 90% (contains 10% water) | 60 | 0.3 | 90 | 6 |
| Sucralose | 3 | 0.015 | 100 | 0 |
| Acesulfame - K | 1.5 | 0.0075 | 100 | 0 |
| Sodium lactate 60% (contains 40% water) | 5 | 0.025 | 60 | 2 |
| Lemon Lime flavor emulsion 1 | 25 | 0.125 | 75 | 6.25 |
| Glycerin | 85.5 | 0.4275 | 100 | 0 |
| Total | 200 | 1 | g H2O | 14.25 |
| | | | % H2O | 7.125 |

Example 1b

Example 1b was prepared as in the case of Example 1a except that lemon lime flavor emulsion 2, which contained 10 000 ppm ascorbic acid and 250 ppm vitamin E, was used. Flavor emulsion 2 was mixed into the cold NADES to give a formulation with a pH of about 3.6 and a water activity of 0.4739 at room temperature.

Example 1c

Example 1c was prepared as in the case of Example 1a except that spray-dried citral formulation 1 (containing 30% citral) was used instead of lemon lime flavor emulsion. Spray-dried citral was mixed into the cold NADES to give a formulation with a pH of about 3.5 and a water activity of 0.3226 at room temperature.

Example 1d

Example 1d was prepared as in the case of Example 1a except that spray-dried citral formulation 2 (containing 30% citral) was used instead of lemon lime flavor emulsion.

Example 1e

Example 1e was prepared as in the case of Example 1a except that spray-dried citral formulation 3 (containing 30% citral) was used instead of lemon lime flavor emulsion.

Example 2a

The NADES base was prepared as described for Example 1a but using citric acid, erythritol and other components as listed in Table 3. The formulation has a water activity of 0.3741 at room temperature and a pH of 3.3 upon 100-fold dilution.

TABLE 3

Components of Erythritol/Citric Acid NADES formulation used in Example 2a

| Citric acid/Erythritol BASE | Amount (wt, g) | | solids (wt %) | water (g) |
|---|---|---|---|---|
| Erythritol | 24.4 | 0.122 | 100 | 0 |
| Citric acid anhydrous | 39.1 | 0.1955 | 100 | 0 |
| Water | 4 | 0.02 | 0 | 4 |
| Sucralose | 3 | 0.015 | 100 | 0 |
| Acesulfame - K | 1 | 0.005 | 100 | 0 |
| Tri-Sodium citrate | 3.5 | 0.0175 | 100 | 0 |
| Lemon Lime flavor emulsion | 24 | 0.12 | 75 | 6 |
| Glycerin | 101 | 0.505 | 100 | 0 |
| | 200 | 1 | g H2O | 10 |
| | | | % H2O | 5 |

Example 2b

Example 2b was prepared as in the case of Example 2a except that lemon lime flavor emulsion 2 was used. Flavor emulsion 2 was mixed into the cold NADES to give a formulation with a water activity of 0.4039 at room temperature and a pH of about 3.4 upon 100-fold dilution.

Example 2c

Example 2c was prepared as in the case of Example 2a except that spray-dried citral formulation 1 (containing 30% citral) was used instead of lemon lime flavor emulsion. Spray-dried citral was mixed into the cold NADES to give a formulation with a water activity of 0.2030 at room temperature and a pH of about 3.5 upon 100-fold dilution.

Example 2d

Example 2d was prepared as in the case of Example 2a except that spray-dried citral formulation 2 (containing 30% citral) was used instead of lemon lime flavor emulsion. Spray-dried citral was mixed into the cold NADES to give a formulation with a water activity of 0.2030 at room temperature and a pH of about 3.5 upon-100 fold dilution.

Example 3a

The NADES base was prepared as described for Example 1a but using lactic acid, fructose and other components as listed in Table 4. The formulation has a water activity of 0.4386 at room temperature and a pH of 3.5 upon 100-fold dilution.

TABLE 4

Components of Fructose/Lactic Acid NADES formulation used in Example 3a

| Fructose/Lactic acid BASE | Amount (wt, g) | | solids (wt %) | water (g) |
|---|---|---|---|---|
| Fructose | 52.5 | 0.2625 | 100 | 0 |
| Lactic acid 90% (10% water) | 60 | 0.3 | 90 | 6 |
| Sucralose | 3 | 0.015 | 100 | 0 |
| Acesulfame - K | 1 | 0.005 | 100 | 0 |
| Sodium lactate | 5 | 0.025 | 60 | 2 |
| Lemon Lime flavor emulsion | 24 | 0.12 | 75 | 6 |
| Glycerin | 54.5 | 0.2725 | 100 | 0 |
| | 200 | 1 | g H2O | 14 |
| | | | % H2O | 7 |

Example 3b

Example 3b was prepared as in the case of Example 3a except that lemon lime flavor emulsion 2 was used. Flavor emulsion 2 was mixed into the cold NADES to give a formulation with a water activity of 0.4739 at room temperature and a pH of about 3.5 upon 100-fold dilution.

Example 4a

A 400 g two component NADES system was prepared along with additional components as set forth in Table 5. Citric acid, sodium citrate and glycerol were mixed with an overhead stirrer (100 rpm) and heated until a molten liquid was formed. Here the system was heated to 115° C. in an oil bath for about 40 minutes. Sucralose and acesulfame-K were then added at this temperature and stirred for 15 min. The clear liquid was allowed to cool to room temperature where it remained in the liquid form. A Lemon Lime flavor and surfactants were stirred at 1500 rpm with an overhead stirrer for 4 minutes into the cold NADES base system to give the final formulation. In this example a mixture of sucrose monopalmitate and phosphatidylcholine was used as the surfactant. The cold NADES give a pH of about 2.6 upon 100-fold dilution.

TABLE 5

Components of Citric Acid NADES formulation used in Example 4a

| Citric acid BASE | Amount (wt, g) | solids (wt %) | | water (g) |
|---|---|---|---|---|
| Citric acid anhydrous | 80 | 0.2 | 100 | 0 |
| Sucralose | 6 | 0.015 | 100 | 0 |
| Acesulfame - K | 2 | 0.005 | 100 | 0 |
| Tri-Sodium citrate dihydrate | 6.9 | 0.017 | 100 | 0.8 |
| Lemon Lime flavor | 4.8 | 0.012 | 0 | 0 |
| Sucrose monopalmitate | 0.48 | 0.001 | 90 | 0 |
| Phosphatidylcholine | 0.12 | 0.0003 | 90 | 0 |
| Glycerin | 299.7 | 0.749 | 100 | 0 |
| | 400 | 1 | g H2O | 0.8 |
| | | | % H2O | 0.002 |

Example 4b

Example 4b was prepared as in the case of Example 4a except that sodium lactate was used instead of tri-sodium citrate. The cold NADES give a pH of about 3.3 upon 100-fold dilution, as listed in Table 6.

TABLE 6

Components of Citric Acid/sodium lactate NADES formulation used in Example 4b

| Citric acid/sodium lactate BASE | Amount (wt, g) | solids (wt %) | | water (g) |
|---|---|---|---|---|
| Citric acid anhydrous | 80 | 0.2 | 100 | 0 |
| Sucralose | 6 | 0.015 | 100 | 0 |
| Acesulfame - K | 2 | 0.005 | 100 | 0 |
| Sodium lactate | 35 | 0.088 | 100 | 0 |
| Lemon Lime flavor | 4.8 | 0.012 | 0 | 0 |
| Sucrose monopalmitate | 0.48 | 0.001 | 90 | 0 |
| Phosphatidylcholine | 0.12 | 0.0003 | 90 | 0 |
| Glycerin | 271.6 | 0.679 | 100 | 0 |
| | 400 | 1 | g H2O | 0 |
| | | | % H2O | 0 |

Example 4c

Example 4c was prepared as in the case of Example 4a except that lactic acid was used instead of citric acid and sodium lactate was used instead of tri-sodium citrate. The cold NADES give a pH of about 2.7 upon 100-fold dilution.

TABLE 7

Components of Lactic Acid NADES formulation used in Example 4c

| Lactic Acid BASE | Amount (wt, g) | solids (wt %) | | water (g) |
|---|---|---|---|---|
| Lactic acid | 120 | 0.3 | 100 | 0 |
| Sucralose | 6 | 0.015 | 100 | 0 |
| Acesulfame - K | 2 | 0.005 | 100 | 0 |
| Sodium lactate | 11.5 | 0.029 | 100 | 0 |
| Lemon Lime flavor | 4.8 | 0.012 | 0 | 0 |
| Sucrose monopalmitate | 0.48 | 0.001 | 90 | 0 |
| Phosphatidylcholine | 0.12 | 0.0003 | 90 | 0 |
| Glycerin | 255.1 | 0.679 | 100 | 0 |
| | 400 | 1 | g H2O | 0 |
| | | | % H2O | 0 |

Example 4d

Example 4d was prepared as in the case of Example 4a except that sodium lactate was used instead of tri-sodium citrate and Tween 80 was used instead of the mixture of sucrose monopalmitate and phosphatidylcholine. The cold NADES give a pH of about 3.2 upon 100-fold dilution, as listed in Table 8.

TABLE 8

Components of Lactic Acid NADES formulation used in Example 4d

| Lactic Acid BASE | Amount (wt, g) | solids (wt %) | | water (g) |
|---|---|---|---|---|
| Citric acid anhydrous | 80 | 0.2 | 100 | 0 |
| Sucralose | 6 | 0.015 | 100 | 0 |
| Acesulfame - K | 2 | 0.005 | 100 | 0 |
| Sodium lactate | 35 | 0.088 | 100 | 0 |
| Lemon Lime flavor | 4.8 | 0.012 | 0 | 0 |
| Tween 80 | 2 | 0.005 | 0 | 0 |
| Glycerin | 270.2 | 0.676 | 100 | 0 |
| | 400 | 1 | g H2O | 0 |
| | | | % H2O | 0 |

Example 5a

The NADES base was prepared as described for Example 1a but using lactic acid, fructose and other components as listed in Table 9. The formulation has a water activity of 0.4386 at room temperature and a pH of 3.7 upon 100-fold dilution.

TABLE 9

Components of Erythritol/Lactic Acid NADES formulation used in Example 5a

| | Amount (wt, g) | solids (purity) of raw material (wt %) | water contribution (g) |
|---|---|---|---|
| Erythritol | 10 | 0.1 | 100 | 0 |
| Lactic acid Purac 100% | 27 | 0.27 | 100 | 0 |
| Sucralose | 1.5 | 0.015 | 100 | 0 |
| Acesulfame - K | 0.75 | 0.0075 | 100 | 0 |
| Sodium lactate 100% | 3 | 0.03 | 100 | 0 |
| Fructose | 2.5 | 0.025 | 100 | 0 |
| Lemon Lime flavor emulsion 2 | 12 | 0.12 | 73 | 3 |
| Glycerin | 45.75 | 0.4575 | 100 | 0 |
| Total | 100 | 1 | g H2O | 3 |
| | | | % H2O | 3 |

Example 5b

Example 5b was prepared as in the case of Example 5a except that maltodextrin 18DE was used instead of fructose. Flavor emulsion 2 was mixed into the cold NADES to give a formulation with a water activity of 0.474 at room temperature and a pH of about 3.7 upon 100-fold dilution.

Example 5c

Example 5c was prepared as in the case of Example 5a except that trehalose was used instead of fructose. Flavor emulsion 2 was mixed into the cold NADES to give a formulation with a water activity of 0.474 at room temperature and a pH of about 3.7 upon 100-fold dilution.

Example 6

Aqueous Beverage Syrup Formulation

Provided herein, as set forth in Table 10, is a base formula. This formula has been known to suffer from flavor degradation. Flavors, and in particular citrus flavor, added to such a base, are oxidized or degraded by acid-catalyzed reactions within a few weeks. For example, within 3 weeks at room temperature, detergent-like, soapy off-notes appear. The content of citral, one of the key flavor components, as will be shown below, is completely gone.

Samples of these aqueous beverage syrups were prepared using the components listed in Table 10 and flavor emulsions 1 and 2.

TABLE 10

| Ingredients | Amounts (wt) |
|---|---|
| Water | 62.20 g |
| Sucralose | 1.50 g |
| Acesulfame - K | 0.75 g |
| Potassium Sorbate | 0.05 g |
| Potassium Citrate | 1.50 g |
| Citric Acid | 20.00 g |
| Lemon Lime Flavor Emulsions | 14.00 g |
| Total | 100.00 g | pH = ±2.00

Stability Testing (Examples 7-8 below)

Samples 1a to 1e, 2a to 2d, 3a to 3b, 4a to 4d and 5a to 5c were stored at 40° C. for 13 weeks along with the bases of Example 6 (without NADES bases).

Example 7

Chemical Stability Testing Samples from Examples 1a to 1d, 2a to 2d, 3a to 3b, 4a to 4d and 5a to 5c.

Figure 2:
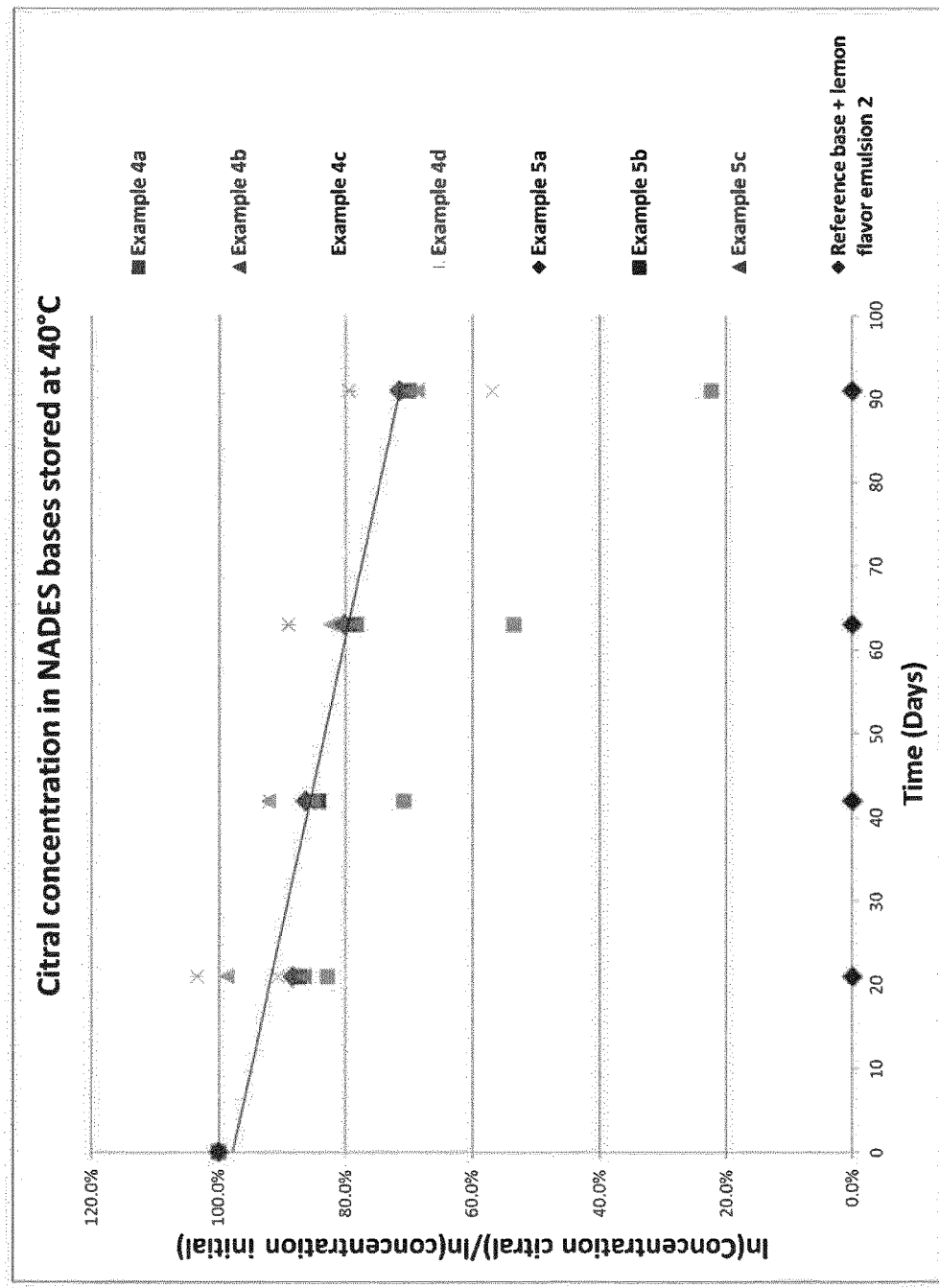
FIG. 2. Concentrations of citral, a key lemon flavor compound, in NADES bases relative to a generic reference as a function of time of examples 4a to 4d and 5a to 5c.
Figure 3:
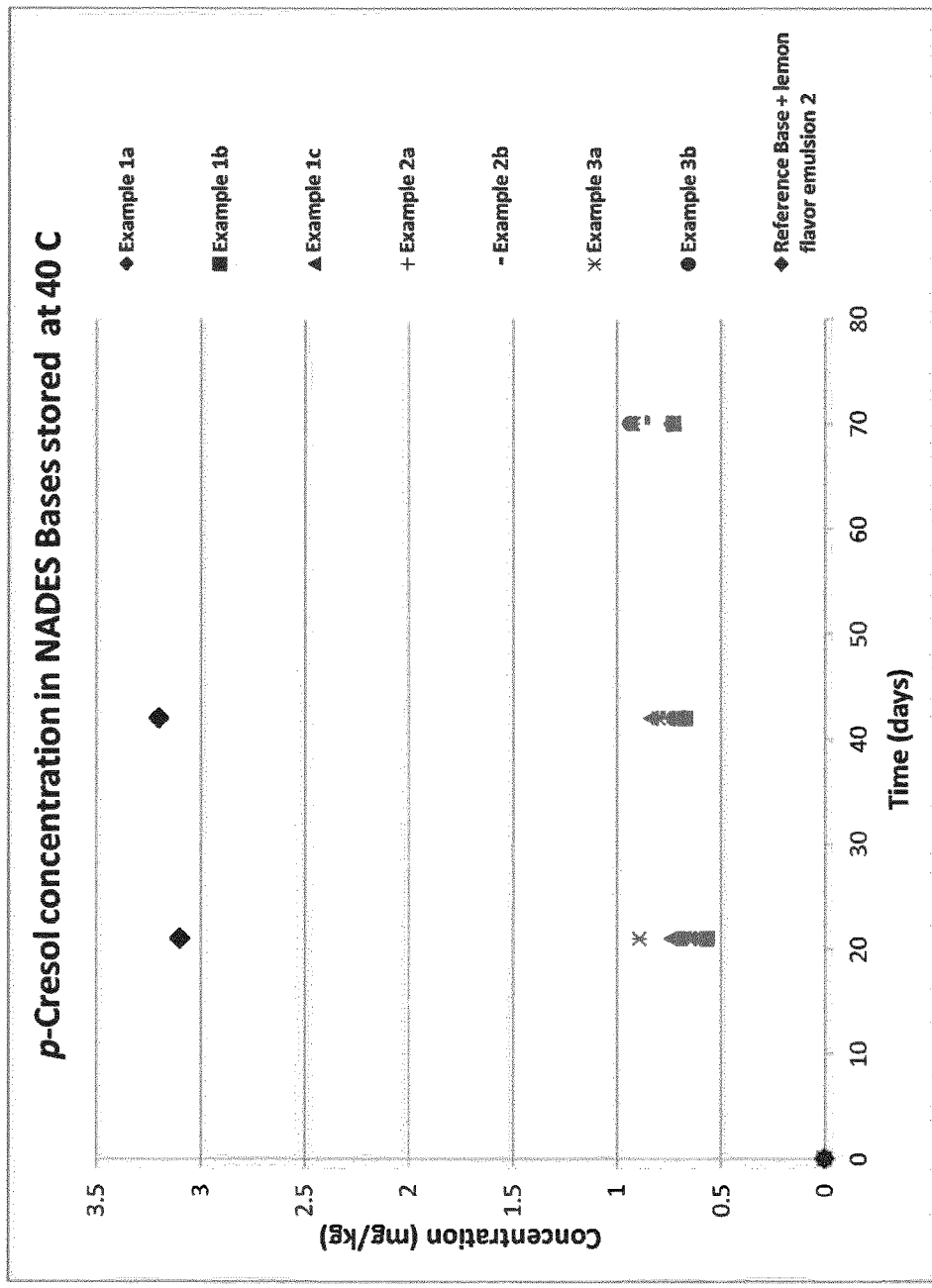
FIG. 3. Concentrations of p-cresol, a key lemon off-flavor compound, in NADES bases relative to a generic reference as a function of time of examples 1a to 1d, 2a to 2d and 3a to 3b.

As noted above, samples from Examples 1a to 1d, 2a to 2d, 3a to 3b, 4a to 4d and 5a to 5c were stored at 40° C. for 13 weeks along with the bases of Example 6 (w/out NADES bases). Aliquots of the samples were tested for concentrations of citral, p-methylacetophenone, and p-cresol as a function of time. Samples were extracted with dichloromethane containing an internal standard. All analyses were performed by GC-MS and GC-FID versus an external calibration. The citral concentrations in the NADES bases were higher than in the reference formulation, Example 6, at all time points (FIGS. 1 and 2). While the citral content was completely degraded after 3 weeks in the reference base 6, the NADES bases 1a-4d demonstrated much better performance over the reference formulation even after 13 weeks stored in a hot box.

Example 8

Figure 4:
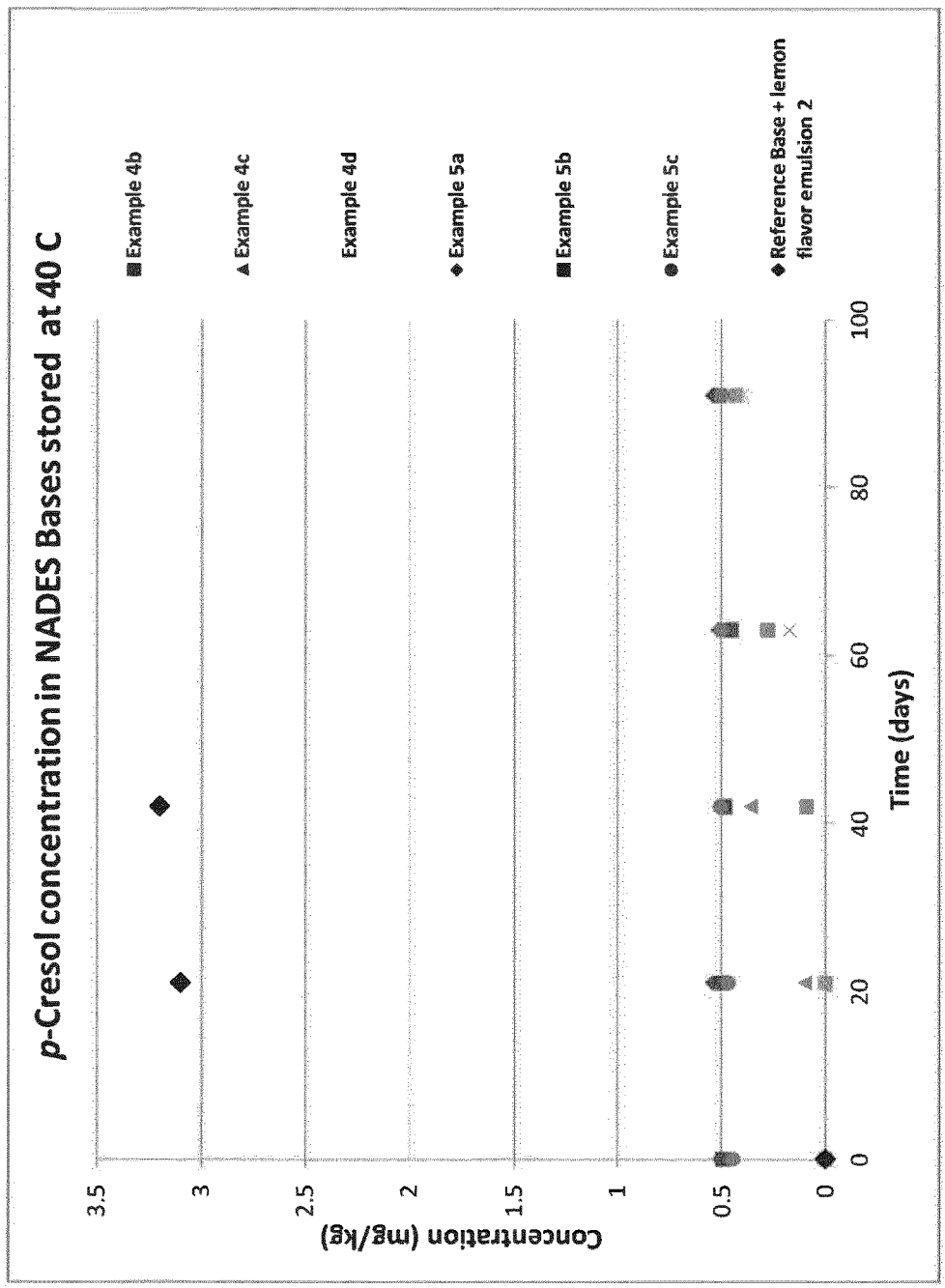
FIG. 4. Concentrations of p-cresol, a key lemon off-flavor compound, in NADES bases relative to a generic reference as a function of time of examples 4a to 4d and 5a to 5c.
Figure 5:
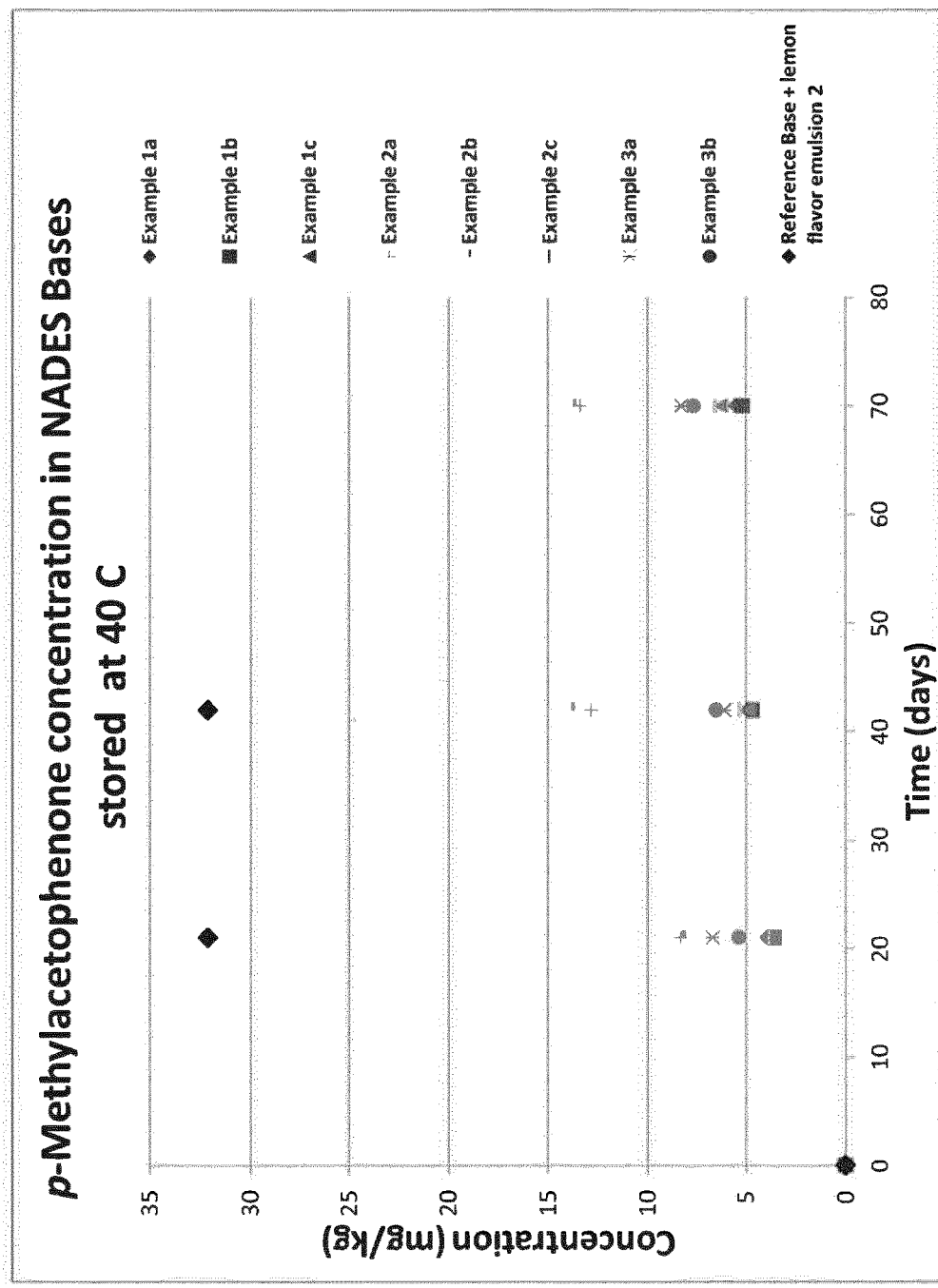
FIG. 5. Concentrations of p-methylacetophenone, a key lemon off-flavor compound, in NADES bases relative to a generic reference as a function of time of examples 1a to 1d, 2a to 2d and 3a to 3b.
Figure 6:
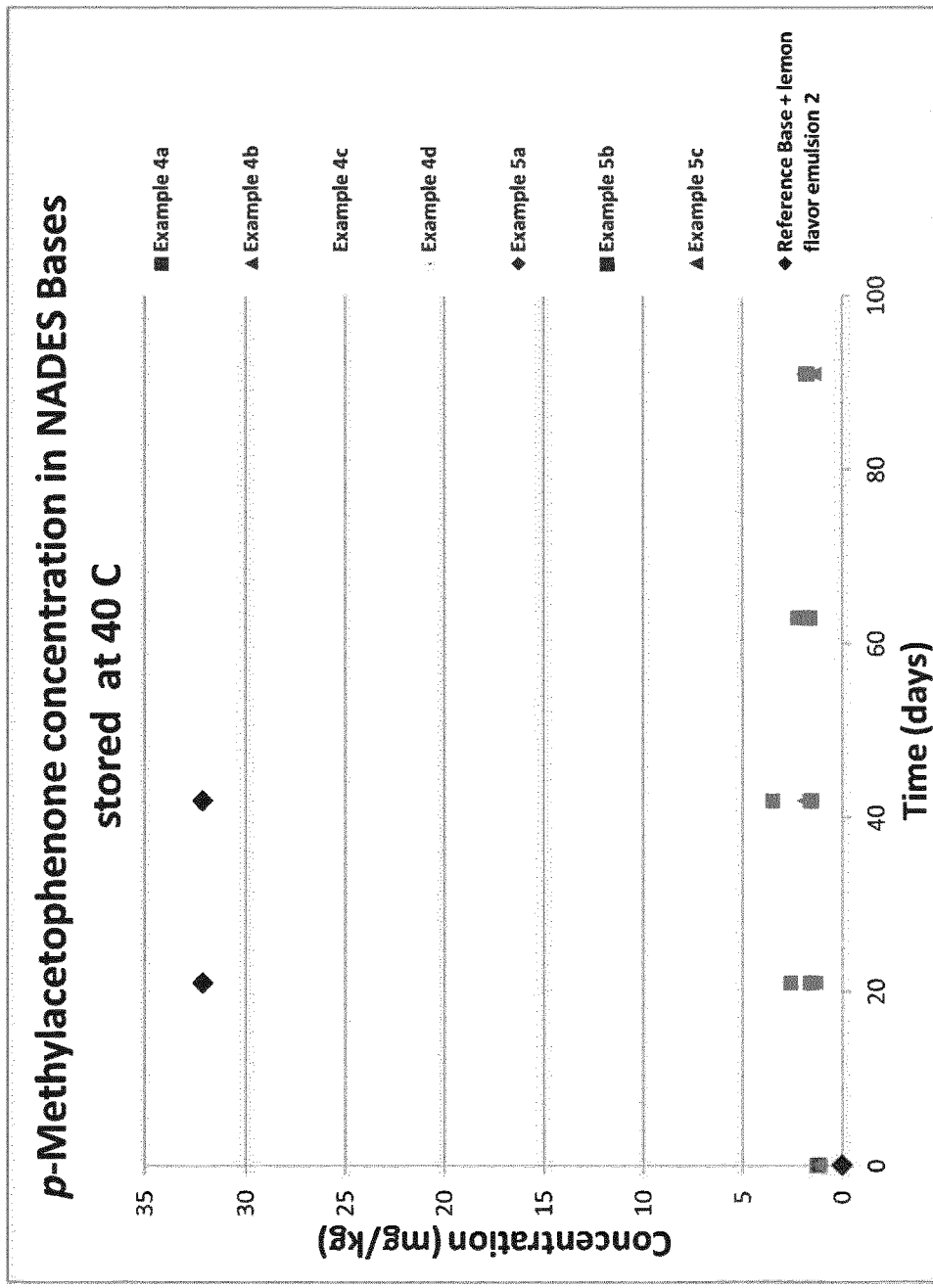
FIG. 6. Concentrations of p-methylacetophenone, a key lemon off-flavor compound, in NADES bases relative to a generic reference as a function of time of examples 4a to 4d and 5a to 5c.
Figure 7:
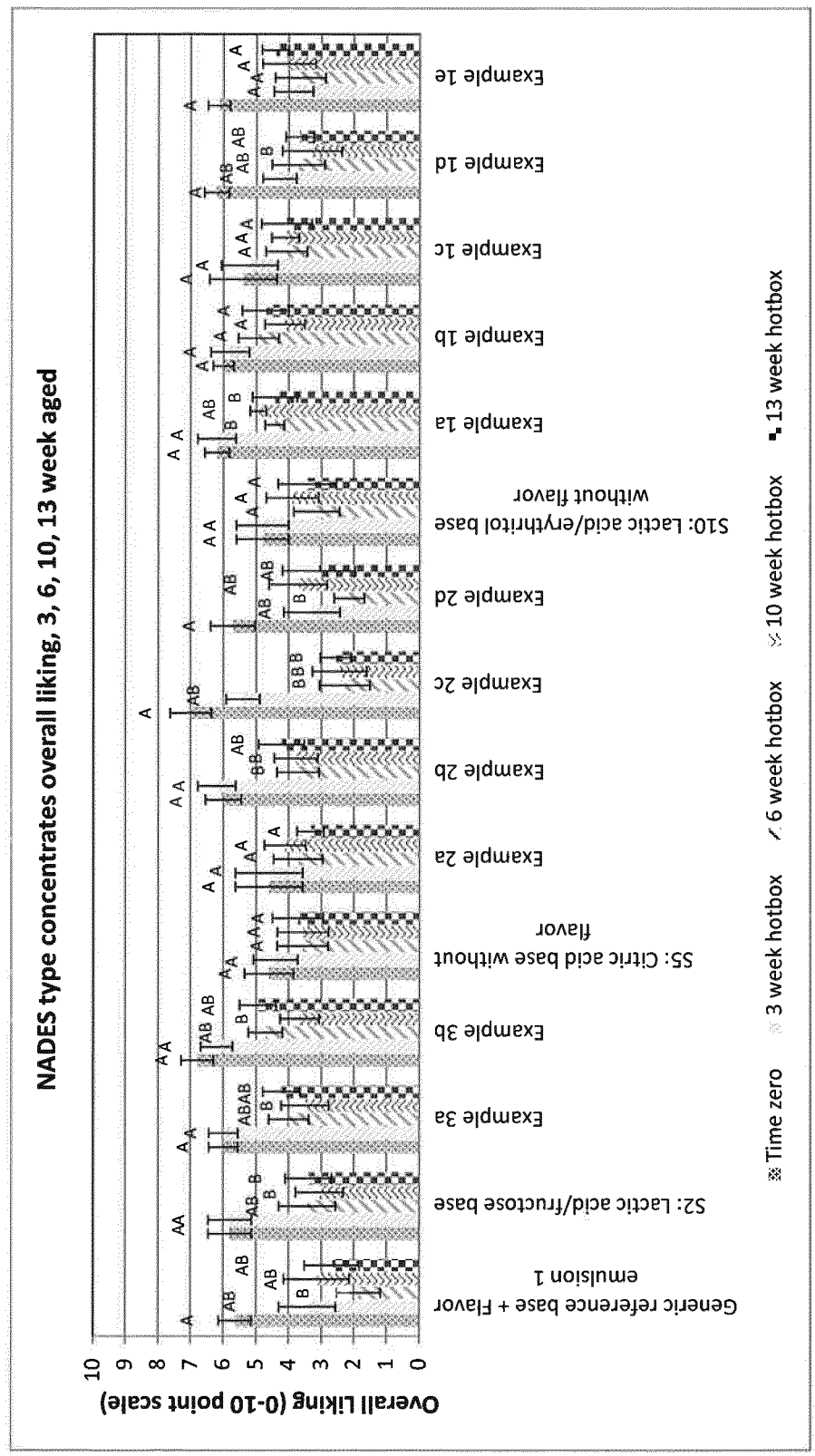
FIG. 7. Overall liking of lemon lime flavors in NADES type concentrates relative to generic syrup reference of examples 1a to 1d, 2a to 2d and 3a to 3b.
Figure 8:
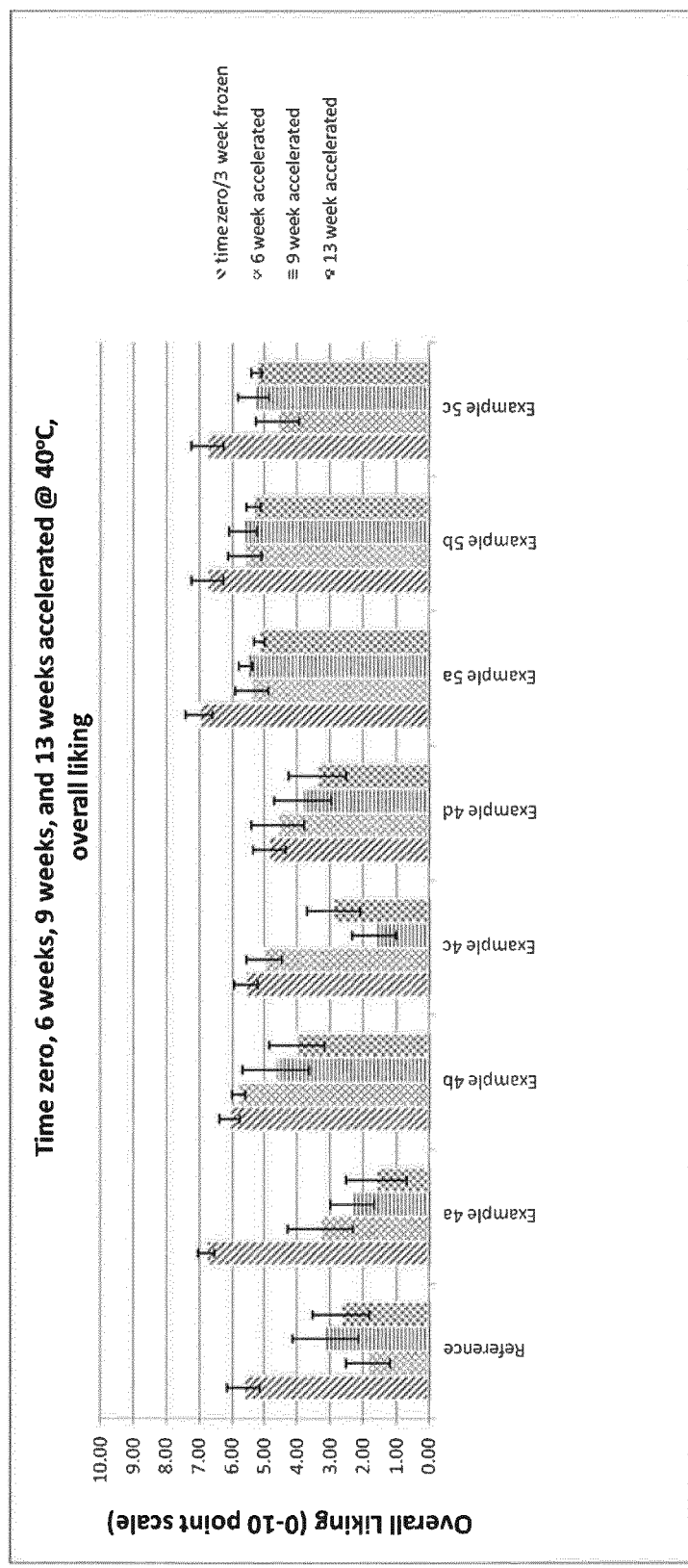
FIG. 8. Overall liking of lemon lime flavors in NADES type concentrates relative to generic syrup reference of examples 4a to 4d and 5a to 5c.
Figure 9:
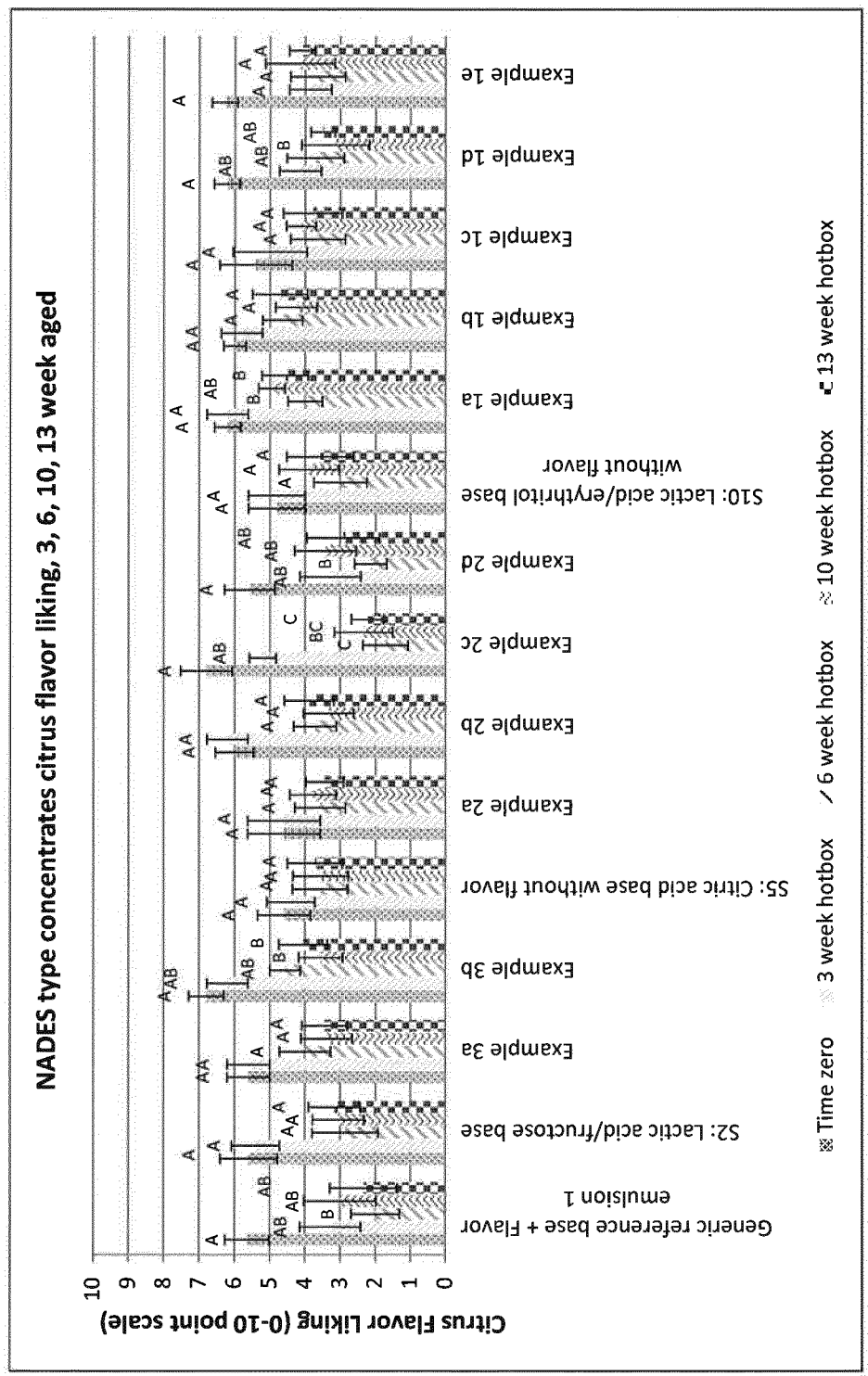
FIG. 9. Citrus flavor liking of lemon lime flavors in NADES type concentrates relative to generic syrup reference of examples 1a to 1d, 2a to 2d and 3a to 3b.
Figure 10:
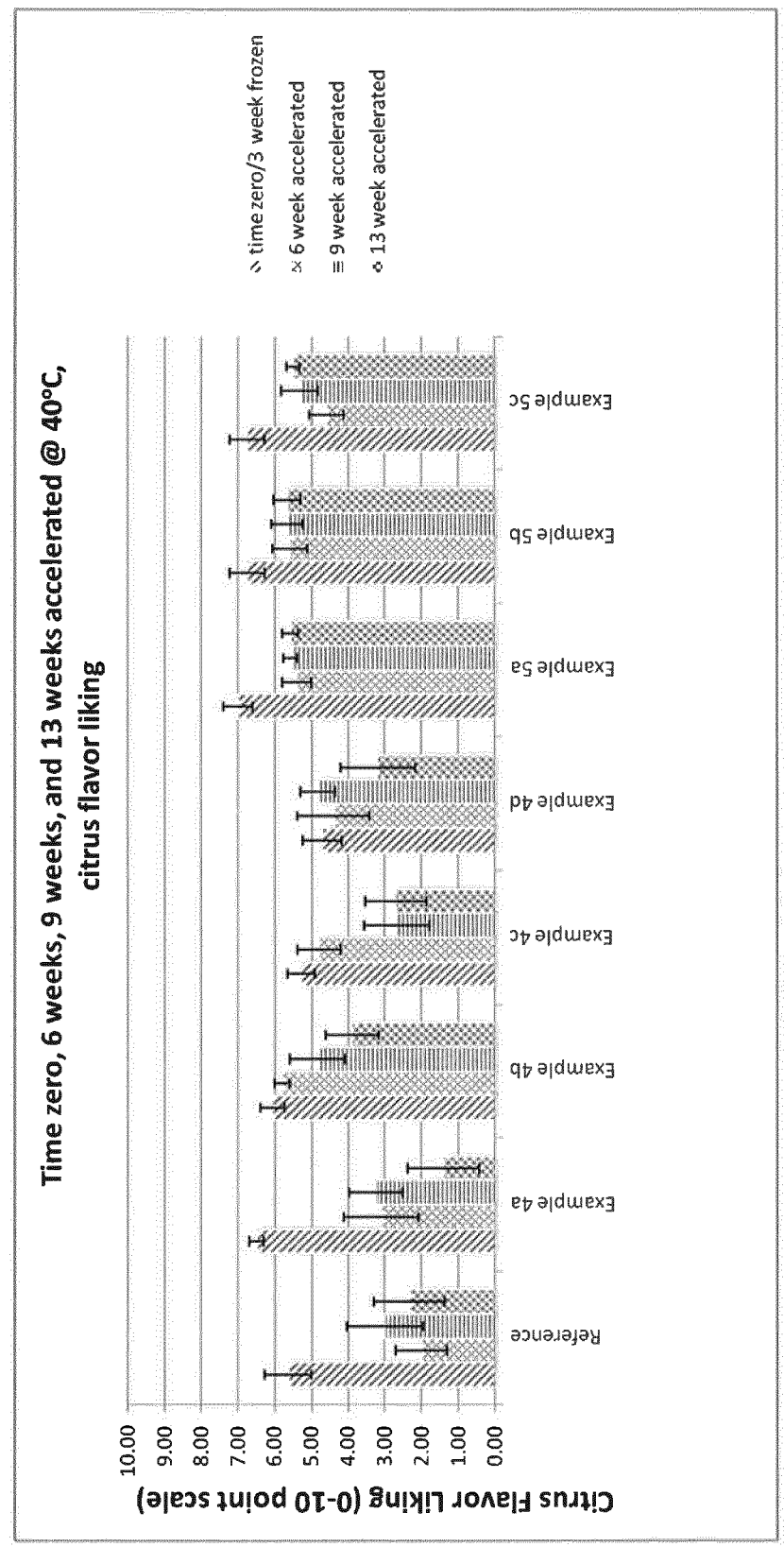
FIG. 10. Citrus flavor liking of lemon lime flavors in NADES type concentrates relative to generic syrup reference of examples 4a to 4d and 5a to 5c.
Figure 11:
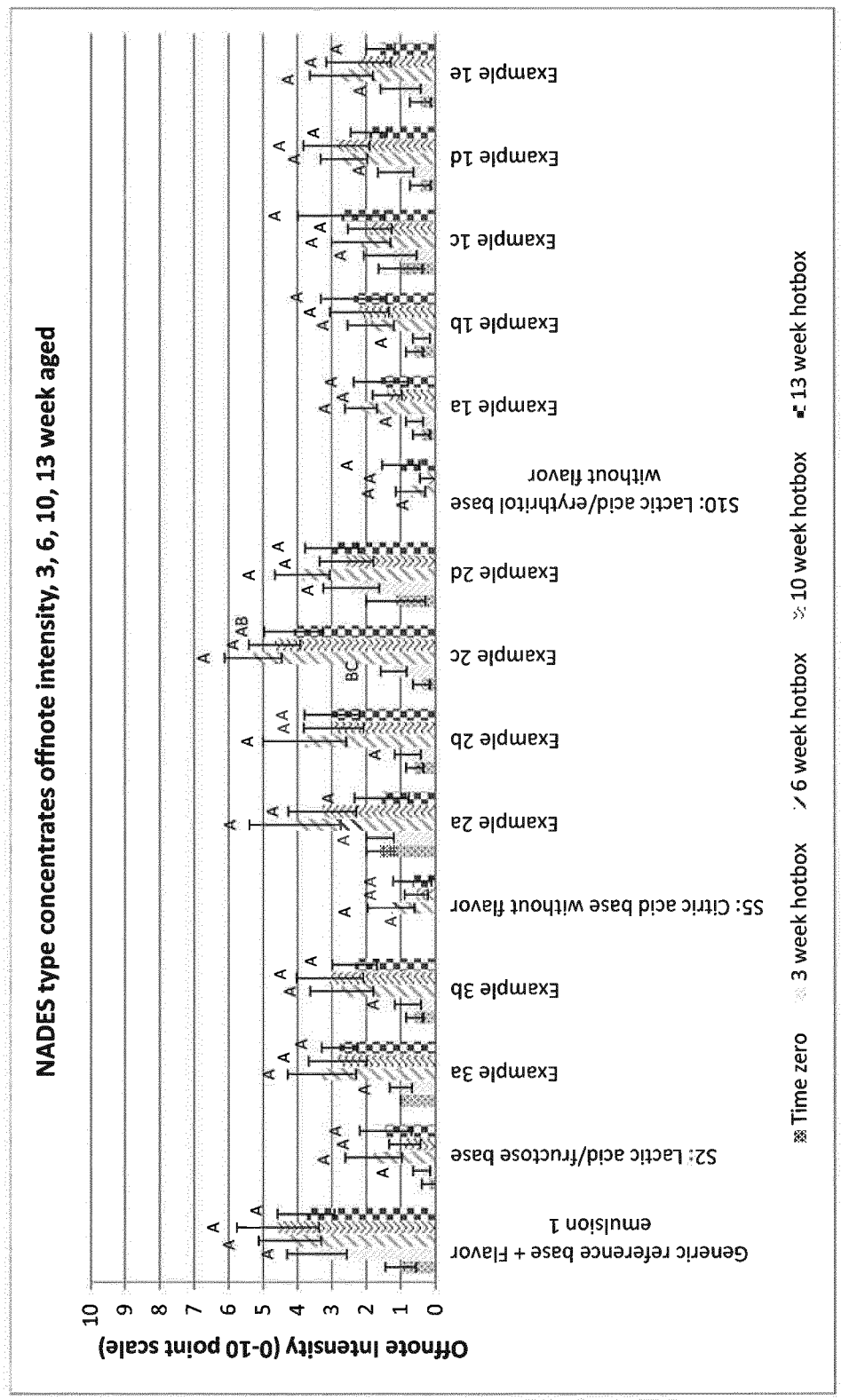
FIG. 11. Offnote intensity of aged lemon lime flavors in NADES type concentrates relative to generic syrup reference of examples 1a to 1d, 2a to 2d and 3a to 3b.
Figure 12:
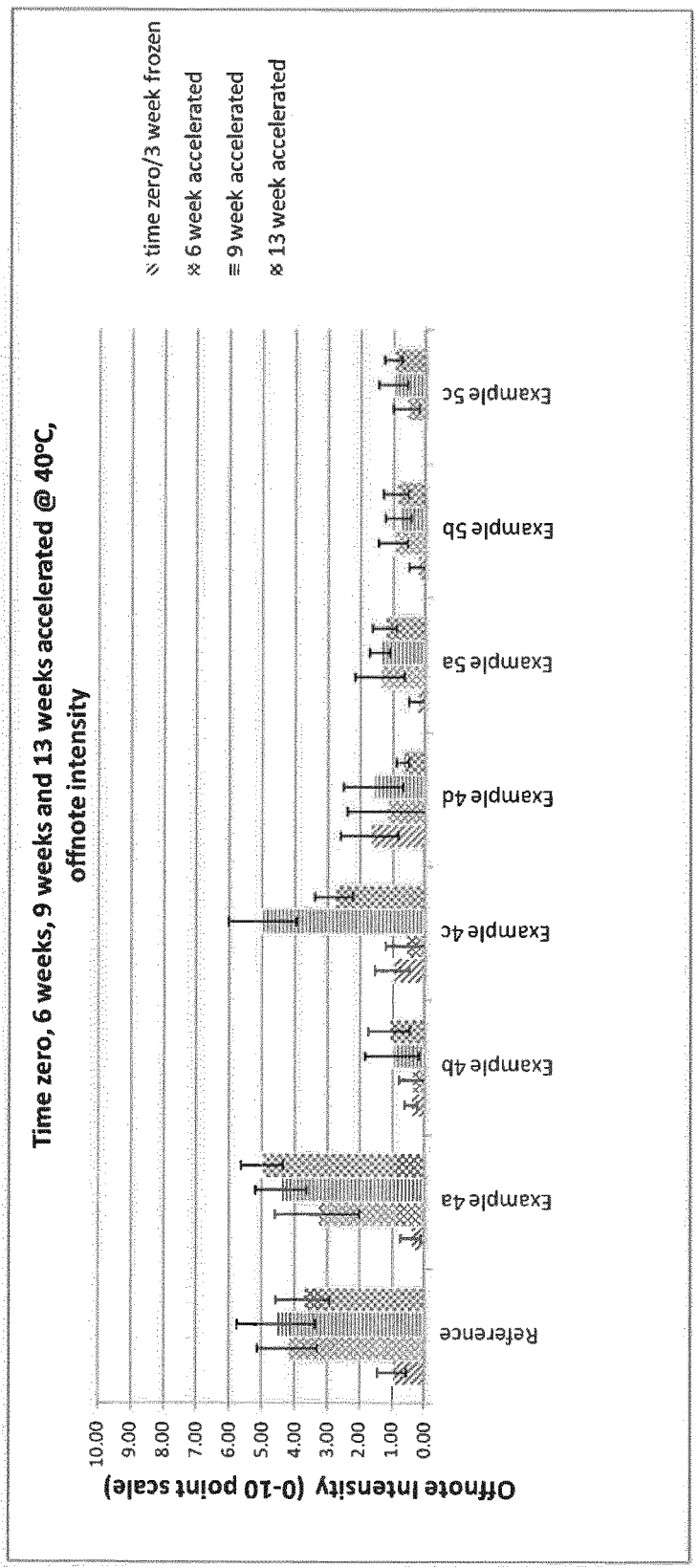
FIG. 12. Offnote intensity of aged lemon lime flavors in NADES type concentrates relative to generic syrup reference of examples 4a to 4d and 5a to 5c.

Examples 1a to 1d, 2a to 2d, 3a to 3b, 4a to 4d and 5a to 5c and Reference Base 6 Sensory Results Beverage samples were prepared by diluting the base samples (2 g) into 240 ml of water. Sensory evaluations were performed by 9 panelists. The samples were tasted blind and rated on a scale of 0-6. Values shown in FIGS. 4 to 6 indicate the average ratings of all panelists. The NADES bases significantly improved the longevity of the citrus flavor. Even after 13 weeks stored in a hot box at 40° C. the sensory properties of the NADES systems were still in an acceptable range.

What is claimed is:

1. A liquid system comprising a food grade salt, an active ingredient, a first component and a second component, wherein the first and second components are selected from the group consisting of carbohydrates, sugar alcohols, food grade acids, and food grade non-aqueous solvents, wherein:
   i) the second component is different than the first component;
   ii) the system has a melting point lower than each of the food grade salt, the first component and the second component; and
   iii) the liquid system comprises less than 5 wt. % water, wherein the liquid system comprises 1.5 wt. % to 8.8 wt. % of the food grade salt, and wherein the food grade salt is a conjugate base of an acid selected from the group consisting of malic acid, citric acid, maleic acid, lactic acid, tartaric acid, sorbic acid, and benzoic acid,
   wherein the first component or the second component comprises a component selected from carbohydrates, sugar alcohols, and food grade acids, wherein at least one of the first component or the second component comprises a food grade acid,
   wherein the active ingredient is susceptible to oxidation and/or acid-catalyzed degradation in aqueous low pH systems,
   wherein the active ingredient is a flavor or a flavor composition; and
   wherein, upon one hundred fold dilution, the liquid system has a pH of from about 2 to about 4.

2. The liquid system as recited in claim 1, wherein the first component is selected from malic acid, citric acid, maleic acid, lactic acid, and tartaric acid, and the second component is selected from glucose, erythritol, fructose, sorbitol, sucrose, trehalose, glycerin, propylene glycol and 1,3-propanediol.

3. The liquid system as recited in claim 1, wherein the combined weight of the first and second components is provided in an amount, by weight, from 50% to 99% of the total weight of the system.

4. The liquid system as recited in claim 1, wherein the active ingredient is provided in an amount of from 1% to 50%, by weight, of the total weight of the system.

5. The liquid system as recited in claim 1, further comprising an additional food grade solvent.

6. The liquid system as recited in claim 1, wherein the active ingredient in the liquid system is more stable against oxidation and/or acid degradation and crystallization for a period of at least 13 weeks at 40° C. as compared to an active ingredient not contained in the liquid system as recited in claim 1 as measured for a period of at least 13 weeks at 40° C.

7. The liquid system as recited in claim 1, wherein the food grade salt is selected from a conjugate base of an acid selected from the group consisting of citric acid, and lactic acid.

8. The liquid system as recited in claim 7, wherein the food grade salt is selected from the group consisting of sodium citrate, and sodium lactate.

* * * * *